(12) United States Patent
Ellison et al.

(10) Patent No.: US 7,089,418 B1
(45) Date of Patent: Aug. 8, 2006

(54) MANAGING ACCESSES IN A PROCESSOR FOR ISOLATED EXECUTION

(75) Inventors: Carl M. Ellison, Portland, OR (US); Roger A. Golliver, Beaverton, OR (US); Howard C. Herbert, Phoenix, AZ (US); Derrick C. Lin, Foster City, CA (US); Francis X. McKeen, Portland, OR (US); Gilbert Neiger, Portland, OR (US); Ken Reneris, Wilbraham, MA (US); James A. Sutton, Portland, OR (US); Shreekant S. Thakkar, Portland, OR (US); Millind Mittal, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,611

(22) Filed: Mar. 31, 2000

(51) Int. Cl.
    *G06F 13/16* (2006.01)
(52) U.S. Cl. ..................................... 713/166
(58) Field of Classification Search ............ 703/23–24; 709/100–250; 710/128; 711/100–200; 712/229; 713/100–200; 395/186
    See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. ............. | 711/166 |
| 4,276,594 A | 6/1981 | Morley | |
| 4,278,837 A | 7/1981 | Best | |
| 4,307,214 A | 12/1981 | McDaniel et al. | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |
| 4,430,709 A | 2/1984 | Schleupen | |
| 4,521,852 A | 6/1985 | Guttag | |
| 4,571,672 A | 2/1986 | Hatada et al. | |
| 4,759,064 A | 7/1988 | Chaum | |
| 4,795,893 A | 1/1989 | Ugon | |
| 4,802,084 A | 1/1989 | Ikegaya et al. | |

(Continued)

FOREIGN PATENT DOCUMENTS

DE     4217444     12/1992

(Continued)

OTHER PUBLICATIONS

J. Heinrich: "MIPS R4000 Microprocessor User's Manual," Apr. 1, 1993, MIPS, MT. View, XP002184449, pp. 61-97.

(Continued)

*Primary Examiner*—Gilberto Barrón, Jr.
*Assistant Examiner*—Ellen C Tran
(74) *Attorney, Agent, or Firm*—Michael R. Barre

(57) ABSTRACT

In one embodiment, a method comprises configuring an access transaction generated by a processor by a configuration storage containing configuration parameters. The processor has a normal execution mode and an isolated execution mode. The access transaction has access information. In a further embodiment, a method comprises checking the access transaction by an access checking circuit using at least one of the configuration parameters and the access information.

22 Claims, 9 Drawing Sheets

U.S. PATENT DOCUMENTS

| | | |
|---|---|---|
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,139,760 A | 8/1992 | Ogawa et al. |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,303,378 A | 4/1994 | Cohen |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubals |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A * | 11/1997 | Johnson et al. ............ 713/200 |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle et al. |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,898,883 A | 4/1999 | Fujii et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,950,221 A | 9/1999 | Draves et al. |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A * | 3/2000 | Panwar et al. ............ 711/118 |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,226,749 B1 * | 5/2001 | Carloganu et al. .......... 713/201 |
| 6,249,872 B1 | 6/2001 | Wildgrube et al. |
| 6,252,650 B1 | 6/2001 | Nakaumra |
| 6,269,392 B1 | 7/2001 | Cotichini et al. |
| 6,272,533 B1 * | 8/2001 | Browne .................... 709/213 |
| 6,272,637 B1 | 8/2001 | Little et al. ................ 713/194 |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery et al. |
| 6,314,409 B1 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |

| | | |
|---|---|---|
| 6,374,317 B1 | 4/2002 | Ajanovic et al. ........... 710/105 |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,499,123 B1 | 12/2002 | McFarland et al. |
| 6,505,279 B1 | 1/2003 | Phillips et al. |
| 6,507,904 B1 * | 1/2003 | Ellison et al. ............... 712/229 |
| 6,529,909 B1 | 3/2003 | Bowman-Amuah |
| 6,535,988 B1 | 3/2003 | Poisner |
| 6,557,104 B1 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 * | 10/2003 | Ellison et al. ............... 711/163 |
| 6,633,981 B1 | 10/2003 | Davis |
| 6,651,171 B1 | 11/2003 | England et al. |
| 6,684,326 B1 | 1/2004 | Cromer et al. |
| 6,701,284 B1 | 3/2004 | Huntley et al. |
| 2001/0021969 A1 | 9/2001 | Burger et al. |
| 2001/0027527 A1 | 10/2001 | Khidekel et al. |
| 2001/0037450 A1 | 11/2001 | Metlitski et al. |

FOREIGN PATENT DOCUMENTS

| | | |
|---|---|---|
| EP | 0473913 | 3/1992 |
| EP | 0600112 | 8/1994 |
| EP | 0892521 | 1/1999 |
| EP | 0930567 A | 7/1999 |
| EP | 0961193 | 12/1999 |
| EP | 0965902 | 12/1999 |
| EP | 1 030 237 A | 8/2000 |
| EP | 1055989 | 11/2000 |
| EP | 1056014 | 11/2000 |
| EP | 1085396 | 3/2001 |
| EP | 1146715 | 10/2001 |
| JP | 2000076139 | 3/2000 |
| WO | WO9524696 | 9/1995 |
| WO | WO 97/29567 | 8/1997 |
| WO | WO9812620 | 3/1998 |
| WO | WO9834365 A | 8/1998 |
| WO | WO9844402 | 10/1998 |
| WO | WO9905600 | 2/1999 |
| WO | WO9909482 | 2/1999 |
| WO | WO9918511 | 4/1999 |
| WO | WO99/38076 | 7/1999 |
| WO | WO9957863 | 11/1999 |
| WO | WO99/65579 | 12/1999 |
| WO | WO0021238 | 4/2000 |
| WO | WO0062232 | 10/2000 |
| WO | WO 01/27723 | 4/2001 |
| WO | WO 01/27821 | 4/2001 |
| WO | WO0163994 | 8/2001 |
| WO | WO 01/75565 | 10/2001 |
| WO | WO 01/75595 | 10/2001 |
| WO | WO0201794 | 1/2002 |
| WO | WO0217555 | 2/2002 |
| WO | WO02060121 | 8/2002 |
| WO | WO0175564 | 10/2002 |
| WO | WO02086684 | 10/2002 |
| WO | WO03058412 | 7/2003 |

OTHER PUBLICATIONS

Brands, Stefan , "Restrictive Blinding of Secret-Key Certificates", *Springer-Verlag XP002201306*, (1995),Chapter 3.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Kashiwagi, Kazuhiko , et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn , et al., "Replacement Strategy for Aging Avionics Computers", *IEEE AES Systems Magazine*, XP002190614,(Mar. 1999).

Menezes, Oorschot , "Handbook of Applied Cryptography", *CRC Press LLC, USA XP002201307*, (1997),475.

Richt, Stefan , et al., "In-Circuit-Emulator Wird Echtzeittauglich", *Elektronic, Franzis Verlag GMBH, Munchen, DE*, vol. 40, No. 16, XP000259620,(100-103),Aug. 6, 1991.

Saez, Sergio , et al., "A Hardware Scheduler for Complex Real-Time Systems", *Proceedings of the IEEE International Symposium on Industrial Electronics*, XP002190615,(Jul. 1999),43-48.

Sherwood, Timothy , et al., "Patchable Instruction ROM Architecture", *Department of Computer Science and Engineering, University of California, San Diego, La Jolla, CA*, (Nov. 2001).

"M68040 User's Manual", 1993, Motorola Inc., p. 1-5-p. 1-9, p. 1-13-p. 1-20, p. 2-1-p. 2-3, p. 4-1, p. 8-9-p. 8-11.

"Intel 386 DX Microprocessor 32-Bit CHMOS Microprocessor With Integrated Memory Management", Dec. 31, 1995, Intel Inc., p. 32-56; figure 4-14.

Joe Heinrich:"MIPS R4000 Microprocessor User's Manual", 1994, MIPS Technology Inc., Mountain View, CA, pp. 67-79.

Berg C: "How do I Create a Signed Applet?", Dr. Dobb's Journal, M&T Publ., Redwood City, CA, US, vol. 22, No. 8, Aug. 1997, pp. 109-111, 122.

Gong L et al: "Going Beyond the Sandbox: An Overview of the New Security Architecture in the Java Development Kit 1.2", Proceedings of the USENIX Symposium on Internet Technologies and Systems, Montery, CA Dec. 1997, pp. 103-112.

Goldberg, R., "Survey of virtual machine research," IEEE Computer Magazine 7(6), pp. 34-45, 1974.

Gun, P.H., "System/370 Extended Architecture: Facilities for Virtual Machines," IBM J. Research Development, vol. 27, No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Nov. 29, 1999; pp. 1-31.

Schneier, Bruce , "Applied Cryptography: Protocols, Algorithm, and Source Code in C", *Wiley, John & Sons, Inc.*, XP002939871; ISBN 0471117099,(Oct. 1995),47-52.

Schneier, Bruce , "Applied Cryptography: Protocols, Algorithm, and Source Code in C", *Wiley, John & Sons, Inc.*, XP002138607; ISBN 0471117099,(Oct. 1995),56-65.

Schneier, Bruce , "Applied Cryptography: Protocols, Algorithms, and Source Code C", *Wiley, John & Sons, Inc.*, XP0021111449; ISBN 0471117099,(Oct. 1995),169-187.

Schneier, Bruce , "Applied Cryptography: Protocols, Algorithms, and Source Code in C", *2nd Edition; Wiley, John & Sons, Inc.*, XP002251738; ISBN 0471128457,(Nov. 1995),28-33; 176-177; 216-217; 461-473; 518-522.

Coulouris, George, et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors (ICCD '86)*, (Oct. 6, 1986,155-160.

Fabry, R.S., "Capability-Based Addressing", Fabry, R.S., "Capability-Based Addressing," *Communications of the ACM*, vol. 17, No. 7, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

Intel Corporation, "IA-64 System Abstraction Layer Specification", *Intel Product Specification, Order No. 245359-001*, (Jan. 2000),1-112.

Intel Corporation, "Intel IA-64 Architecture Software Developer's Manual", vol. 2: *IA-64 System Architecture, Order No. 245318-001*, (Jan. 2000),i, ii, 5.1-5.3, 11.1-11.8, 11.23-11.26.

Menezes, Alfred J., et al., "Handbook of Applied Cryptography", *CRC Press Series on Discrete Mathematics and its Applications*, Boca Raton, FL, XP002165287, ISBN 0849385237,(Oct. 1996),403-405, 506-515. 570.

Nanba, S., et al., "VM/4: ACOS-4 Virtual Machine Architecture", *VM/4: ACOS-4 Virtual Machine Architecture, IEEE*, (1985),171-178.

RSA SECURITY, "Hardware Authenticators", www.rsasecurity.com/node.asp?id =1158, 1-2.

RSA SECURITY, "RSA SecurID Authenticators", www.rsasecurity.com/products/securid/datasheets/SID_DS_0103.pdf, 1-2.

RSA SECURITY, "Software Authenticators", www.srasecurity.com/node.asp?id—1313, 1-2.

Chien, Andrew A., et al., "Safe and Protected Execution for the Morph/AMRM Reconfigurable Processor", *7th Annual IEEE Symposium, FCCM '99 Proceedings, XP010359180, ISBN 0-7695-0375-6*, Los Alamitos, CA, (Apr. 21, 1999),209-221.

Compaq Computer Corporation, et al., "Trusted Computing Platform Alliance (TCPA) Main Specification Version 1.1a", (Dec. 2001),1-321.

IBM, "Information Display Technique for a Terminate Stay Resident Program IBM Technical Disclosure Bulletin", *TDB-ACC-No. NA9112156*, vol. 34, Issue 7A, (Dec. 1, 1991),156-158.

Karger, Paul., et al., "A VMM Security Kernal for the VAX Architecture", *Proceedings of the Symposium on Research in Security and Privacy, XP010020182, ISBN 0-8186-2060-9*, Boxborough, MA, (May 7, 1990),2-19.

Robin, John S., et al., "Analysis of the Pentium's Ability to Support a Secure Virtual Machine Monitor", *Proceedings of the 9th USENIX Security Symposium, XP002247347*, Denver, Colorado, (Aug. 14, 2000),1-17.

U.S. Appl. No. 09/672,603, Controlling Accesses To Isolated Memory Using A Memory Controller For Isolated Execution.

U.S. Appl. No. 09/822,986, Checking File Integrity Using Signature Generated In Isolated Execution.

U.S. Appl. No. 09/538,951, Platform And Method For Issuing And Certifying A Hardware-Protedted Attestation Key.

U.S. Appl. No. 09/539,344, Managing A Secure Platform Using A Hierarchical Executive Architecture In Isolated Execution Mode.

U.S. Appl. No. 09/668,585, Managing A Secure Platform Using A Hierarchical Executive Architecture In Isolated Execution Mode.

U.S. Appl. No. 09/541,108, Platform And Method For Remote Attestation Of A Platform.

U.S. Appl. No. 09/540,612, Platform And Method For Generating And Utilizing A Protected Audit Log.

U.S. Appl. No. 09/540,946, Protecting Software Environment In Isolated Execution.

U.S. Appl. No. 09/668,610, Protecting Software Environment In Isolated Execution.

U.S. Appl. No. 09/538,954, Generating Isolated Bus Cycles For Isolated Execution.

U.S. Appl. No. 09/539,348, Patent No. 6,760,941, Generating A Key Hierarchy For Use In An Isolated Execution Environment.

U.S. Appl. No. 09/541,477, Patent No. 6,507,904, Isolated Instructions For Isolated Execution.

U.S. Appl. No. 09/540,611, Managing Accesses In A Processor For Isolated Execution.

U.S. Appl. No. 09/540,613, Managing A Secure Environment Using A Chipset In Isolated Execution Mode.

U.S. Appl. No. 09/668,408, Managing A Secure Environment Using A Chipset In Isolated Execution Mode.

U.S. Appl. No. 09/541,667, Attestation Key Memory Device And Bus.

U.S. Appl. No. 09/672,602, Attestation Key Memory Device And Bus.

U.S. Appl. No. 09/618,738, Patent No. 6,678,825, Controlling Access To Multiple Isolated Memories In An Isolated Execution Environment.

U.S. Appl. No. 09/618,489, Patent No. 6,633,963, Controlling Access To Multiple Memory Zones In An Isolated Execution Environment.

U.S. Appl. No. 10/683,542, Controlling Access To Multiple Memory Zones In An Isolated Execution Environment.

U.S. Appl. No. 09/618,659, Resetting A Processor In An Isolated Execution Environment.

U.S. Appl. No. 09/751,586, Resetting A Processor In An Isolated Execution Environment.

\* cited by examiner

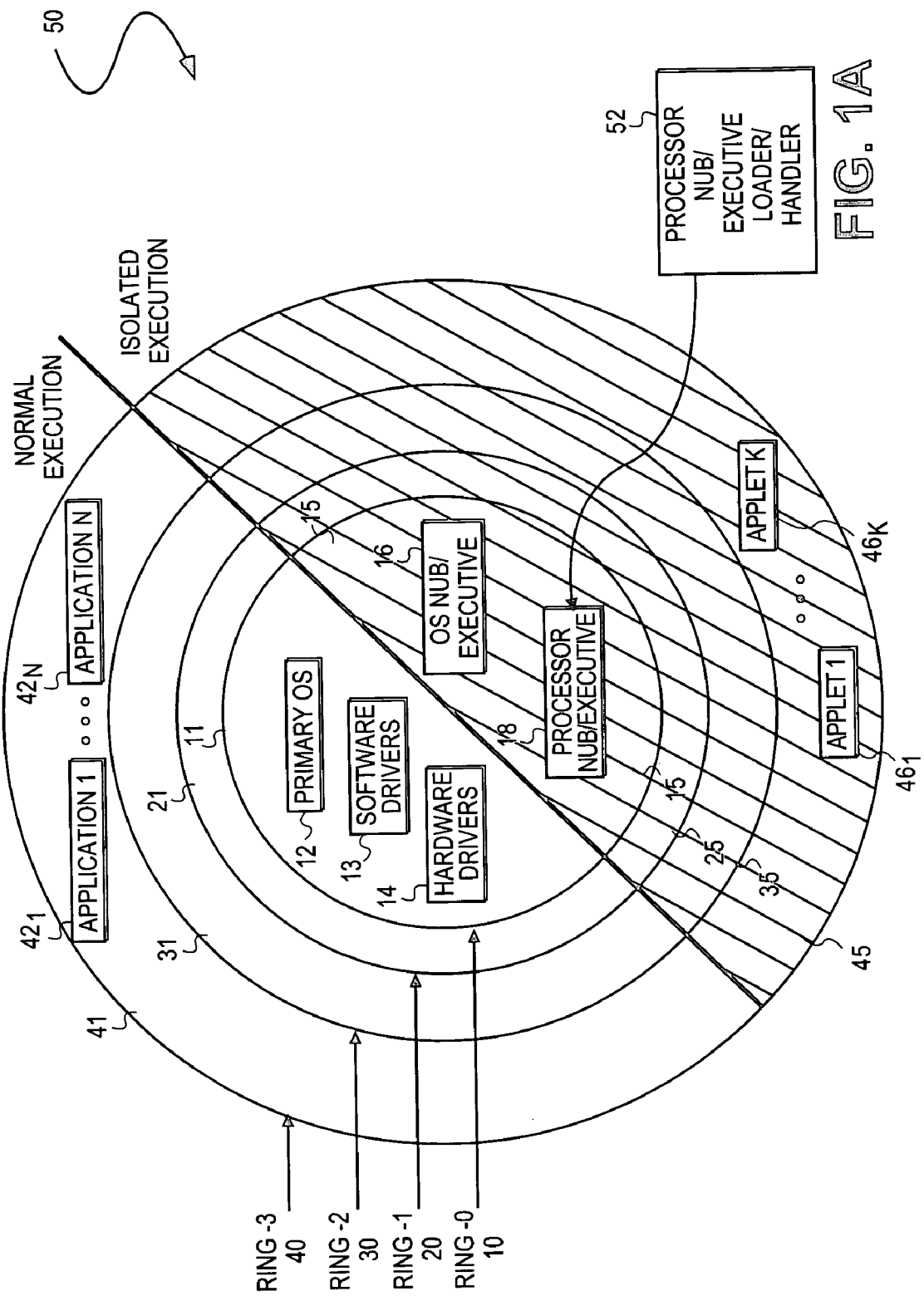

MANAGING ACCESSES IN A PROCESSOR FOR ISOLATED EXECUTION

BACKGROUND

1. Field of the Invention

This invention relates to microprocessors. In particular, the invention relates to processor security.

2. Description of Related Art

Advances in microprocessor and communication technologies have opened up many opportunities for applications that go beyond the traditional ways of doing business. Electronic commerce (E-commerce) and business-to-business (B2B) transactions are now becoming popular, reaching the global markets at a fast rate. Unfortunately, while modem microprocessor systems provide users convenient and efficient methods of doing business, communicating and transacting, they are also vulnerable to unscrupulous attacks. Examples of these attacks include virus, intrusion, security breach, and tampering, to name a few. Computer security, therefore, is becoming more and more important to protect the integrity of the computer systems and increase the trust of users.

Threats caused by unscrupulous attacks may be in a number of forms. Attacks may be remote without requiring physical accesses. An invasive remote-launched attack by hackers may disrupt the normal operation of a system connected to thousands or even millions of users. A virus program may corrupt code and/or data of a single-user platform.

Existing techniques to protect against attacks have a number of drawbacks. Anti-virus programs can only scan and detect known viruses. Most anti-virus programs use a weak policy in which a file or program is assumed good until proved bad. For many security applications, this weak policy may not be appropriate. In addition, most anti-virus programs are used locally where they are resident in the platform. This may not be suitable in a group work environment. Security co-processors or smart cards using cryptographic or other security techniques have limitations in speed performance, memory capacity, and flexibility. Redesigning operating systems creates software compatibility issues and causes tremendous investment in development efforts.

BRIEF DESCRIPTION OF THE DRAWINGS

The features and advantages of the present invention will become apparent from the following detailed description of the present invention in which:

FIG. 1A is a diagram illustrating a logical operating architecture according to one embodiment of the invention.

DESCRIPTION

Figure 1B:
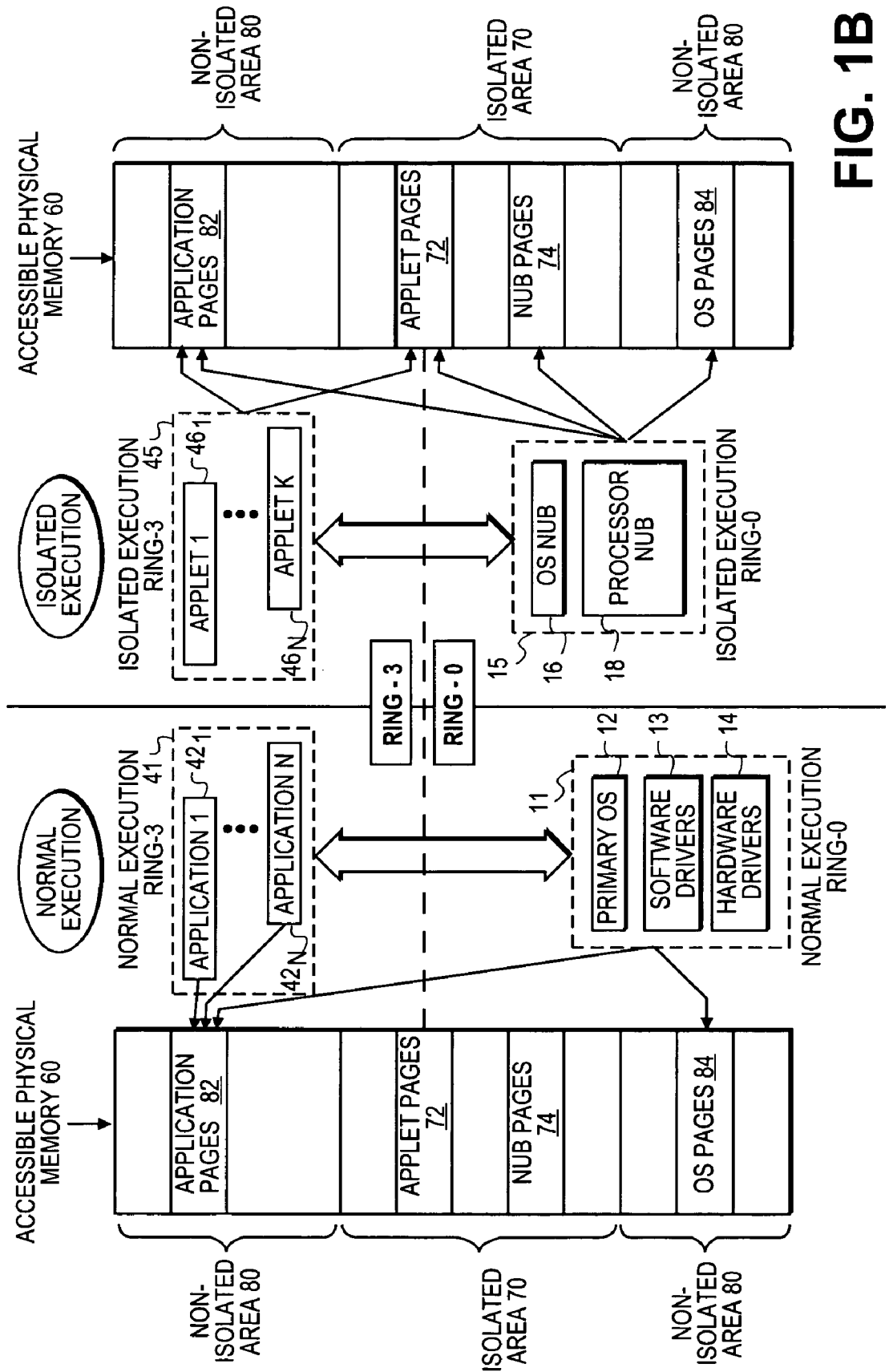
FIG. 1B is a diagram illustrating accessibility of various elements in the operating system and the processor according to one embodiment of the invention.

In one embodiment of the present invention, a technique is provided to manage accesses in a processor for isolated execution. A configuration storage contains configuration parameters to configure an access transaction generated by a processor. The processor has a normal execution mode and an isolated execution mode. The access transaction has access information. An access checking circuit checks the access transaction using at least one of the configuration parameters and the access information.

The configuration parameters include an isolated setting and an execution mode word. The access information includes a physical address and an access type which indicates if the access transaction is a memory access, an input/output access, or a logical processor access. The logical processor access is one of a logical processor entry and a logical processor exit. The configuration storage includes a setting storage to contain the isolated setting for defining an isolated memory area corresponding to a memory external to the processor. The setting storage includes a base register, a mask register, and a length register to store a base value, a mask value and a length value, respectively. The base, mask, and length values form the isolated setting. The configuration storage further includes a processor control register to contain the execution mode word which is asserted when the processor is configured in the isolated execution mode.

In one embodiment, the access checking circuit includes an address detector to detect if the physical address is within the isolated memory area defined by the isolated setting. Two access checks are performed: one is on the physical address provided by the translation lookaside buffer (TLB) and another is on the physical address snooped on the front side bus (FSB). The address detector generates a processor isolated access signal. The access checking circuit further includes a snoop checking circuit to generate a processor snoop access signal. The snoop checking circuit includes a snoop combiner to combine a cache access signal, the FSB isolated access signal, and an external isolated access signal from another processor. The combined cache access signal, the FSB isolated access signal and the external isolated access signal correspond to the processor snoop access signal. The access checking circuit further includes an access grant generator to generate an access grant signal indicating if the access transaction is valid.

In another embodiment, the access checking circuit includes a logical processor manager to manage a logical processor operation caused by the logical processor access. The logical processor manager includes (1) a logical processor register to store a logical processor count indicating a number of logical processor currently enabled, (2) a state enabler to enable a logical processor state when the logical processor access is valid, (3) a updater to update the logical processor count according to the logical processor access, the logical processor updater is enabled by the enabled logical processor state, (4) a minimum detector to determine if the logical processor count is equal to a minimum logical processor value, and (5) a maximum detector to determine if the logical processor count exceeds a maximum logical processor value. The logical processor updater initializes the logical processor register when there is no enabled logical processor. The logical processor updater updates the logical processor count in a first direction when the access transaction corresponds to the logical processor entry, and updates the logical processor count in a second direction opposite to the first direction when the access transaction corresponds to the logical processor exit. When the logical processor count is equal to the minimum logical processor value, the logical processor manager causes the processor to initialize the cache memory and the isolated setting from all isolated information. When the logical processor count exceeds the maximum logical processor value, the logical processor manager causes the processor to generate a failure or fault condition.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Architecture Overview

One principle for providing security in a computer system or platform is the concept of an isolated execution architecture. The isolated execution architecture includes logical and physical definitions of hardware and software components that interact directly or indirectly with an operating system of the computer system or platform. An operating system and the processor may have several levels of hierarchy, referred to as rings, corresponding to various operational modes. A ring is a logical division of hardware and software components that are designed to perform dedicated tasks within the operating system. The division is typically based on the degree or level of security and/or protection. For example, a ring-0 is the innermost ring, being at the highest level of the hierarchy. Ring-0 encompasses the most critical, security-sensitive components. In addition, modules in Ring-0 can also access to lesser privileged data, but not vice versa. Ring-3 is the outermost ring, being at the lowest level of the hierarchy. Ring-3 typically encompasses users or applications level and has the least security protection. Ring-1 and ring-2 represent the intermediate rings with decreasing levels of security and/or protection.

FIG. 1A is a diagram illustrating a logical operating architecture 50 according to one embodiment of the invention. The logical operating architecture 50 is an abstraction of the components of an operating system and the processor. The logical operating architecture 50 includes ring-0 10, ring-1 20, ring-2 30, ring-3 40, and a processor nub loader 52. The processor nub loader 52 is an instance of a processor executive (PE) handler. The PE handler is used to handle and/or manage a processor executive (PE) as will be discussed later. The logical operating architecture 50 has two modes of operation: normal execution mode and isolated execution mode. Each ring in the logical operating architecture 50 can operate in both modes. The processor nub loader 52 operates only in the isolated execution mode.

Ring-0 10 includes two portions: a normal execution Ring-0 11 and an isolated execution Ring-0 15. The normal execution Ring-0 11 includes software modules that are critical for the operating system, usually referred to as kernel. These software modules include primary operating system (e.g., kernel) 12, software drivers 13, and hardware drivers 14. The isolated execution Ring-0 15 includes an operating system (OS) nub 16 and a processor nub 18. The OS nub 16 and the processor nub 18 are instances of an OS executive (OSE) and processor executive (PE), respectively. The OSE and the PE are part of executive entities that operate in a secure environment associated with the isolated area 70 and the isolated execution mode. The processor nub loader 52 is a protected bootstrap loader code held within a chipset in the system and is responsible for loading the processor nub 18 from the processor or chipset into an isolated area as will be explained later.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications $42_1$ to $42_N$ and isolated execution ring-3 includes K applets $46_1$ to $46_K$.

One concept of the isolated execution architecture is the creation of an isolated region in the system memory, referred to as an isolated area, which is protected by both the processor and chipset in the computer system. The isolated region may also be in cache memory, protected by a translation lookaside buffer (TLB) access check. Access to this isolated region is permitted only from a front side bus (FSB) of the processor, using special bus (e.g., memory read and write) cycles, referred to as isolated read and write cycles. The special bus cycles are also used for snooping. The isolated read and write cycles are issued by the processor executing in an isolated execution mode. The isolated execution mode is initialized using a privileged instruction in the processor, combined with the processor nub loader 52. The processor nub loader 52 verifies and loads a ring-0 nub software module (e.g., processor nub 18) into the isolated area. The processor nub 18 provides hardware-related services for the isolated execution.

One task of the processor nub 18 is to verify and load the ring-0 OS nub 16 into the isolated area, and to generate the root of a key hierarchy unique to a combination of the platform, the processor nub 18, and the operating system nub 16. The operating system nub 16 provides links to services in the primary OS 12 (e.g., the unprotected segments of the operating system), provides page management within the isolated area, and has the responsibility for loading ring-3 application modules 45, including applets $46_1$ to 46K, into protected pages allocated in the isolated area. The operating system nub 16 may also load ring-0 supporting modules.

The operating system nub 16 may choose to support paging of data between the isolated area and ordinary (e.g., non-isolated) memory. If so, then the operating system nub 16 is also responsible for encrypting and hashing the isolated area pages before evicting the page to the ordinary memory, and for checking the page contents upon restoration of the page. The isolated mode applets $46_1$ to $46_K$ and their data are tamper- and monitor-proof from all software attacks from other applets, as well as from non-isolated-space applications (e.g., $42_1$ to $42_N$), dynamic link libraries (DLLs), drivers and even the primary operating system 12. Only the processor nub 18 or the operating system nub 16 can interfere with or monitor the applet's execution.

FIG. 1B is a diagram illustrating accessibility of various elements in the operating system 10 and the processor according to one embodiment of the invention. For illustration purposes, only elements of ring-0 10 and ring-3 40 are shown. The various elements in the logical operating architecture 50 access an accessible physical memory 60 according to their ring hierarchy and the execution mode.

The accessible physical memory 60 includes an isolated area 70 and a non-isolated area 80. The isolated area 70 includes applet pages 72 and nub pages 74. The non-isolated area 80 includes application pages 82 and operating system pages 84. The isolated area 70 is accessible only to elements of the operating system and processor operating in isolated execution mode. The non-isolated area 80 is accessible to all elements of the ring-0 operating system and to the processor.

The normal execution ring-0 11 including the primary OS 12, the software drivers 13, and the hardware drivers 14, can access both the OS pages 84 and the application pages 82. The normal execution ring-3, including applications 42 1 to 42N, can access only to the application pages 82. Both the normal execution ring-0 11 and ring-3 41, however, cannot access the isolated area 70.

The isolated execution ring-0 15, including the OS nub 16 and the processor nub 18, can access to both of the isolated area 70, including the applet pages 72 and the nub pages 74, and the non-isolated area 80, including the application pages 82 and the OS pages 84. The isolated execution ring-3 45, including applets $46_1$ to $46_K$, can access only to the application pages 82 and the applet pages 72. The applets $46_1$ to $46_K$ reside in the isolated area 70.

Figure 1C:
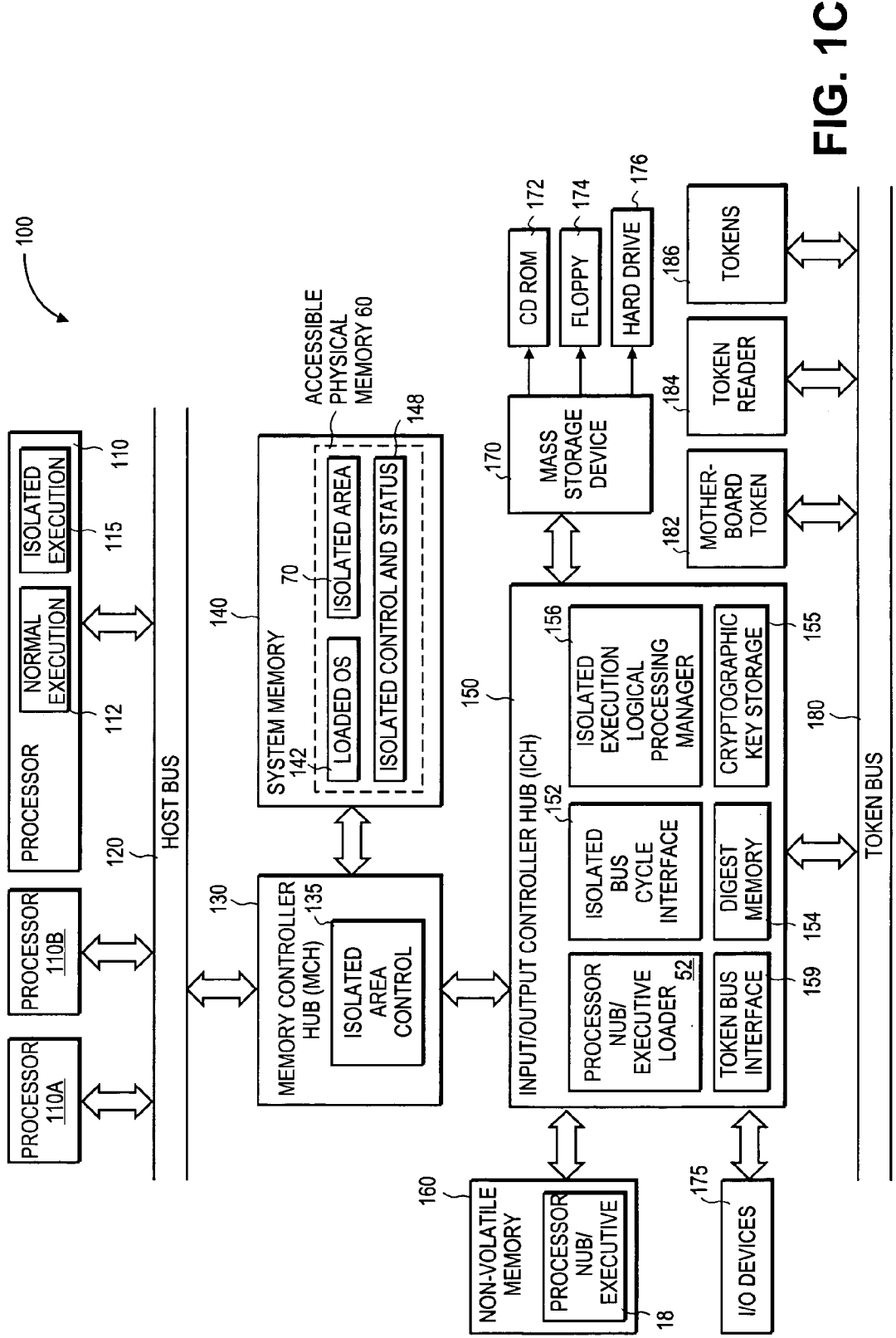
FIG. 1C is a diagram illustrating a computer system in which one embodiment of the invention can be practiced.

FIG. 1C is a diagram illustrating a computer system 100 in which one embodiment of the invention can be practiced. The computer system 100 includes a processor 110, a host bus 120, a memory controller hub (MCH) 130, a system memory 140, an input/output controller hub (ICH) 150, a non-volatile memory, or system flash, 160, a mass storage device 170, input/output devices 175, a token bus 180, a motherboard (MB) token 182, a reader 184, and a token 186. The MCH 130 may be integrated into a chipset that integrates multiple functionalities such as the isolated execution mode, host-to-peripheral bus interface, memory control. Similarly, the ICH 150 may also be integrated into a chipset together or separate from the MCH 130 to perform I/O functions. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The processor 110 represents a central processing unit of any type of architecture, such as complex instruction set computers (CISC), reduced instruction set computers (RISC), very long instruction word (VLIW), or hybrid architecture. In one embodiment, the processor 110 is compatible with an Intel Architecture (IA) processor, such as the Pentium™ series, the IA-32™ and the IA-64™. The processor 110 includes a normal execution mode 112 and an isolated execution circuit 115. The normal execution mode 112 is the mode in which the processor 110 operates in a non-secure environment, or a normal environment without the security features provided by the isolated execution mode. The isolated execution circuit 115 provides a mechanism to allow the processor 110 to operate in an isolated execution mode. The isolated execution circuit 115 provides hardware and software support for the isolated execution mode. This support includes configuration for isolated execution, definition of an isolated area, definition (e.g., decoding and execution) of isolated instructions, generation of isolated access bus cycles, and generation of isolated mode interrupts.

In one embodiment, the computer system 100 can be a single processor system, such as a desktop computer, which has only one main central processing unit, e.g. processor 110. In other embodiments, the computer system 100 can include multiple processors, e.g. processors 110, 1 10a, 10b, etc., as shown in FIG. 1C. Thus, the computer system 100 can be a multi-processor computer system having any number of processors. For example, the multi-processor computer system 100 can operate as part of a server or workstation environment. The basic description and operation of processor 110 will be discussed in detail below. It will be appreciated by those skilled in the art that the basic description and operation of processor 1 10 applies to the other processors 110a and 110b, shown in FIG. 1C, as well as any number of other processors that may be utilized in the multi-processor computer system 100 according to one embodiment of the present invention.

The processor 110 may also have multiple logical processors. A logical processor, sometimes referred to as a thread, is a functional unit within a physical processor having an architectural state and physical resources allocated according to some partitioning policy. Within the context of the present invention, the terms "thread" and "logical processor" are used to mean the same thing. A multi-threaded processor is a processor having multiple threads or multiple logical processors. A multi-processor system (e.g., the system comprising the processors 110, 110a, and 110b) may have multiple multi-threaded processors.

The host bus 120 provides interface signals to allow the processor 110 or processors 110, 100a, and 1 10b to communicate with other processors or devices, e.g., the MCH 130. In addition to normal mode, the host bus 120 provides an isolated access bus mode with corresponding interface signals for memory read and write cycles when the processor 110 is configured in the isolated execution mode. The isolated access bus mode is asserted on memory accesses initiated while the processor 110 is in the isolated execution mode. The isolated access bus mode is also asserted on instruction pre-fetch and cache write-back cycles if the address is within the isolated area address range and the processor 110 is initialized in the isolated execution mode. The processor 110 responds to snoop cycles to a cached address within the isolated area address range if the isolated access bus cycle is asserted and the processor 110 is initialized into the isolated execution mode.

The MCH 130 provides control and configuration of memory and input/output devices such as the system memory 140 and the ICH 150. The MCH 130 provides interface circuits to recognize and service isolated access assertions on memory reference bus cycles, including isolated memory read and write cycles. In addition, the MCH 130 has memory range registers (e.g., base and length registers) to represent the isolated area in the system memory 140. Once configured, the MCH 130 aborts any access to the isolated area that does not have the isolated access bus mode asserted.

The system memory 140 stores system code and data. The system memory 140 is typically implemented with dynamic random access memory (DRAM) or static random access memory (SRAM). The system memory 140 includes the accessible physical memory 60 (shown in FIG. 1B). The accessible physical memory includes a loaded operating system 142, the isolated area 70 (shown in FIG. 1B), and an isolated control and status space 148. The loaded operating system 142 is the portion of the operating system that is loaded into the system memory 140. The loaded OS 142 is typically loaded from a mass storage device via some boot code in a boot storage such as a boot read only memory (ROM). The isolated area 70, as shown in FIG. 1B, is the memory area that is defined by the processor 110 when operating in the isolated execution mode. Access to the isolated area 70 is restricted and is enforced by the processor 110 and/or the MCH 130 or other chipset that integrates the isolated area functionalities. The isolated control and status space 148 is an input/output (I/O)-like, independent address space defined by the processor 110 and/or the MCH 130. The isolated control and status space 148 contains mainly the isolated execution control and status registers. The isolated control and status space 148 does not overlap any existing address space and is accessed using the isolated bus cycles. The system memory 140 may also include other programs or data which are not shown.

The ICH 150 represents a known single point in the system having the isolated execution functionality. For clarity, only one ICH 150 is shown. The system 100 may have many ICHs similar to the ICH 150. When there are multiple ICHs, a designated ICH is selected to control the isolated area configuration and status. In one embodiment, this selection is performed by an external strapping pin. As is known by one skilled in the art, other methods of selecting can be used, including using programmable configuring registers. The ICH 150 has a number of functionalities that are designed to support the isolated execution mode in addition to the traditional I/O functions. In particular, the ICH 150 includes an isolated bus cycle interface 152, the processor nub loader 52 (shown in FIG. 1A), a digest memory 154, a cryptographic key storage 155, an isolated execution logical processor manager 156, and a token bus interface 159.

The isolated bus cycle interface 152 includes circuitry to interface to the isolated bus cycle signals to recognize and service isolated bus cycles, such as the isolated read and write bus cycles. The processor nub loader 52, as shown in FIG. 1A, includes a processor nub loader code and its digest (e.g., hash) value. The processor nub loader 52 is invoked by execution of an appropriate isolated instruction (e.g., Iso-Create) and is transferred to the isolated area 70. From the isolated area 80, the processor nub loader 52 copies the processor nub 18 from the system flash memory (e.g., the processor nub code 18 in non-volatile memory 160) into the isolated area 70, verifies and logs its integrity, and manages a symmetric key used to protect the processor nub's secrets. In one embodiment, the processor nub loader 52 is implemented in read only memory (ROM). For security purposes, the processor nub loader 52 is unchanging, tamper-proof and non-substitutable. The digest memory 154, typically implemented in RAM, stores the digest (e.g., hash) values of the loaded processor nub 18, the operating system nub 16, and any other critical modules (e.g., ring-0 modules) loaded into the isolated execution space. The cryptographic key storage 155 holds a symmetric encryption/decryption key that is unique for the platform of the system 100. In one embodiment, the cryptographic key storage 155 includes internal fuses that are programmed at manufacturing. Alternatively, the cryptographic key storage 155 may also be created with a random number generator and a strap of a pin. The isolated execution logical processor manager 156 manages the operation of logical processors operating in isolated execution mode. In one embodiment, the isolated execution logical processor manager 156 includes a logical processor count register that tracks the number of logical processors participating in the isolated execution mode. The token bus interface 159 interfaces to the token bus 180. A combination of the processor nub loader digest, the processor nub digest, the operating system nub digest, and optionally additional digests, represents the overall isolated execution digest, referred to as isolated digest. The isolated digest is a fingerprint identifying the ring-0 code controlling the isolated execution configuration and operation. The isolated digest is used to attest or prove the state of the current isolated execution.

The non-volatile memory 160 stores non-volatile information. Typically, the non-volatile memory 160 is implemented in flash memory. The non-volatile memory 160 includes the processor nub 18. The processor nub 18 provides the initial set-up and low-level management of the isolated area 70 (in the system memory 140), including verification, loading, and logging of the operating system nub 16, and the management of the symmetric key used to protect the operating system nub's secrets. The processor nub 18 may also provide application programming interface (API) abstractions to low-level security services provided by other hardware. The processor nub 18 may also be distributed by the original equipment manufacturer (OEM) or operating system vendor (OSV) via a boot disk.

The mass storage device 170 stores archive information such as code (e.g., processor nub 18), programs, files, data, applications (e.g., applications $42_1$ to $42_N$), applets (e.g., applets $46_1$ to $46_K$) and operating systems. The mass storage device 170 may include compact disk (CD) ROM 172, floppy diskettes 174, and hard drive 176, and any other magnetic or optical storage devices. The mass storage device 170 provides a mechanism to read machine-readable media. When implemented in software, the elements of the present invention are the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a compact disk CD-ROM, an optical disk, a hard disk, a fiber optical medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, an Intranet, etc.

I/O devices 175 may include any I/O devices to perform I/O functions. Examples of I/O devices 175 include a controller for input devices (e.g., keyboard, mouse, trackball, pointing device), media card (e.g., audio, video, graphics), a network card, and any other peripheral controllers.

The token bus 180 provides an interface between the ICH 150 and various tokens in the system. A token is a device that performs dedicated input/output functions with security functionalities. A token has characteristics similar to a smart card, including at least one reserved-purpose public/private key pair and the ability to sign data with the private key. Examples of tokens connected to the token bus 180 include a motherboard token 182, a token reader 184, and other portable tokens 186 (e.g., smart card). The token bus interface 159 in the ICH 150 connects through the token bus 180 to the ICH 150 and ensures that when commanded to prove the state of the isolated execution, the corresponding token (e.g., the motherboard token 182, the token 186) signs only valid isolated digest information. For purposes of security, the token should be connected to the digest memory.

Managing Accesses in Isolated Execution Mode

Figure 2A:
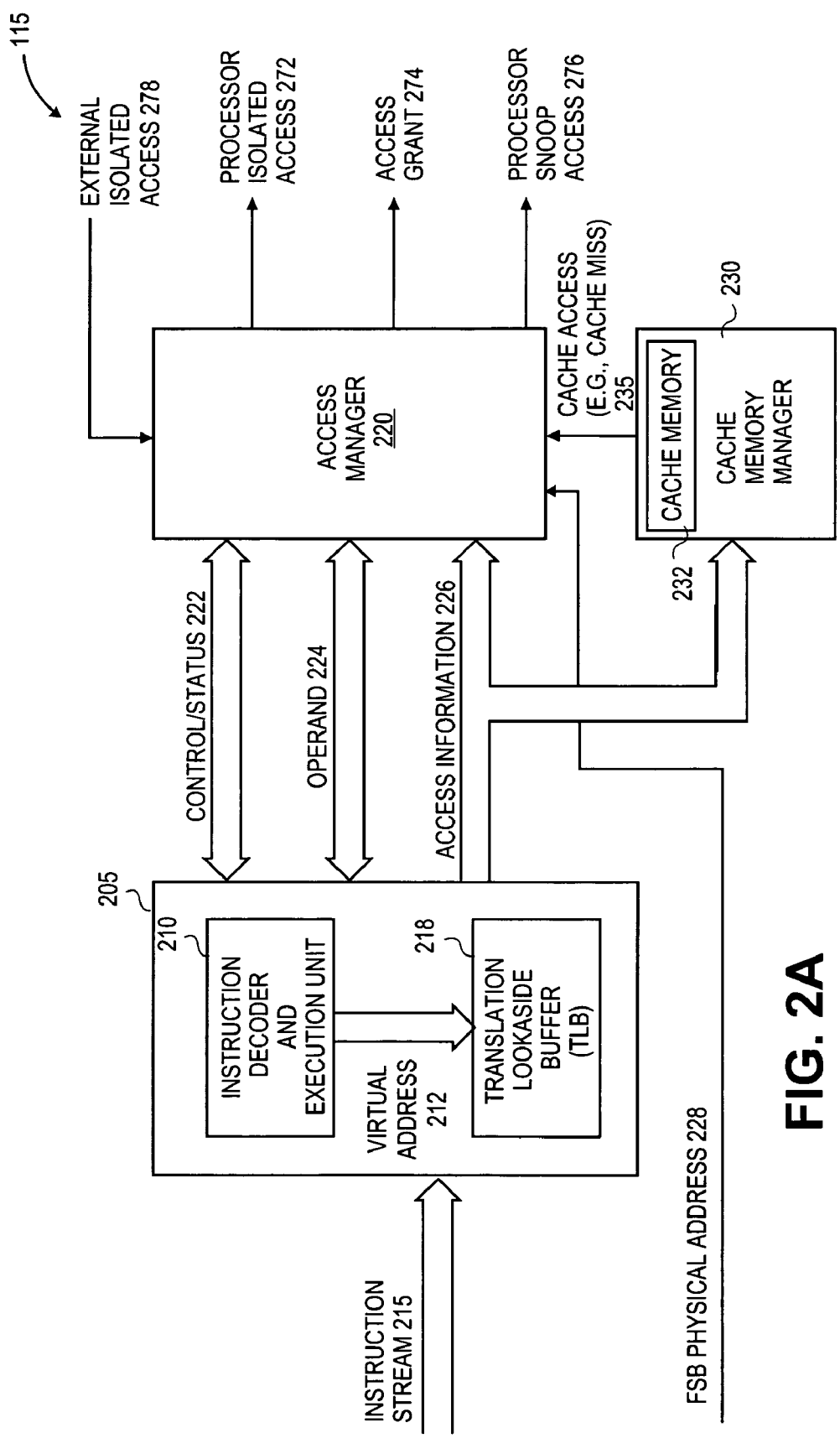
FIG. 2A is a diagram illustrating the isolated execution circuit shown in FIG. 1C according to one embodiment of the invention.

FIG. 2A is a diagram illustrating the isolated execution circuit 115 shown in FIG. 1C according to one embodiment of the invention. The isolated execution circuit 1115 includes a core execution circuit 205, an access manager 220, and a cache memory manager 230.

The core execution unit 205 includes an instruction decoder and execution unit 210 and a translation lookaside buffer (TLB) 218. The instruction decoder and execution unit 210 receives an instruction stream 215 from an instruction fetch unit. The instruction stream 215 includes a number of instructions. The instruction decoder and execution unit 210 decodes the instructions and executes the decoded instructions. These instructions may be at the micro- or macro- level. The instruction decoder and execution unit 210 may be a physical circuit or an abstraction of a process of decoding and execution of instructions. In addition, the instructions may include isolated instructions and non-isolated instructions. The instruction decoder and execution unit 210 generates a virtual address 212 when there is an access transaction caused by executing the instructions. The TLB 218 translates the virtual address 212 into a physical address.

The core execution circuit 205 interfaces with the access manager 220 via control/status information 222, operand 224, and access information 226. The control/status information 222 includes control bits to manipulate various elements in the access manager 220 and status data from the access manager 220. The operand 224 includes data to be written to and read from the access manager 220. The access information 226 includes address (e.g., the physical address provided by the TLB 218), read/write, and access type information.

The access manager 220 receives and provides the control/status information 222, the operand 224, receives the access information 226 from the core execution circuit 205 as a result of instruction execution, receives a cache access signal 235 from the cache memory manager 230, and receives an external isolated access signal 278 from another processor in the system. The external isolated access signal 278 is asserted when another processor in the system attempts to access the isolated memory area. The access manager 220 generates a processor isolated access signal 272, an access grant signal 274, and a processor snoop access signal 276. The processor isolated access signal 272 may be used to generate an isolated bus cycle sent to devices (e.g., chipsets) external to the processor 110 to indicate that the processor 110 is executing an isolated mode instruction. The processor snoop access signal 276 may be used by other devices or chipsets to determine if a snoop access is a hit or a miss. The processor isolated access signal 272, the access grant signal 274, and the processor snoop access signal 276 may also be used internally by the processor 110 to control and monitor other isolated or non-isolated activities.

The cache memory manager 230 receives the access information 226 from the core execution circuit 205 and generates the cache access signal 235 to the access manager 220. The cache memory manager 230 includes a cache memory 232 to store cache information and other circuits to manage cache transactions as known by one skilled in the art. The cache access signal 235 indicates the result of the cache access. In one embodiment, the cache access signal 235 is a cache miss signal which is asserted when there is a cache miss from a cache access.

Figure 2B:
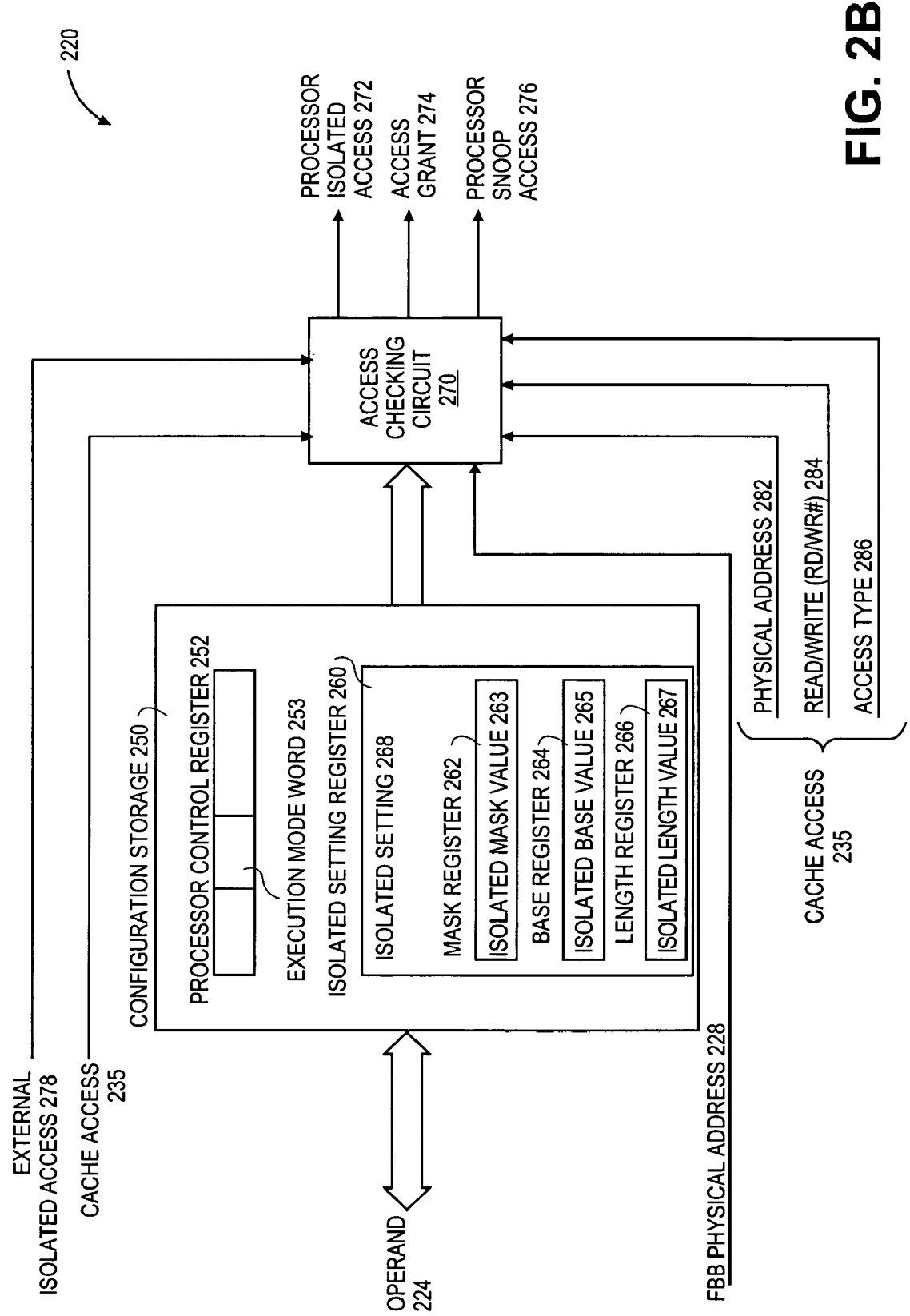
FIG. 2B is a diagram illustrating the access manager shown in FIG. 2A according to one embodiment of the invention.

FIG. 2B is a diagram illustrating the access manager shown in FIG. 2A according to one embodiment of the invention. The access manager 220 includes a configuration storage 250 and an access checking circuit 270. The access manager 220 exchanges operand 224 with and receives the access information 226 from the core execution circuit 205 shown in FIG. 2A. The access manager 220 also receives the cache access signal 235 from the cache manager 230 and the external isolated access signal 278 from another processor as shown in FIG. 2A. The access information 226 includes a physical address 282, a read/write (RD/WR#) signal 284, and an access type 286. The access information 226 is generated during an access transaction by the processor 110. The access type 286 indicates a type of access, including a memory reference, an input/output (I/O) reference, and a logical processor access. The logical processor access includes a logical processor entry to an isolated enabled state, and a logical processor withdrawal from an isolated enabled state.

The configuration storage 250 contains configuration parameters to configure an access transaction generated by the processor 110. The processor 110 has a normal execution mode and an isolated execution mode. The access transaction has the access information 226 as discussed above. The configuration storage 250 receives the operand 224 from the instruction decoder and execution unit 2 1 0 (FIG. 2A) and includes a processor control register 252 and an isolated setting register 260. The processor control register 252 contains an execution mode word 253. The execution mode word 253 is asserted when the processor 110 is configured in the isolated execution mode. In one embodiment, the execution mode word 253 is a single bit indicating if the processor 110 is in the isolated execution mode. The isolated setting register 260 contains an isolated setting 268. The isolated setting 268 defines the isolated memory area (e.g., the isolated area 70 in the system memory 140 shown in FIG. 1C). The isolated setting register 260 includes a mask register 262, a base register 264 and a length register 266. The mask register 262 contains an isolated mask value 263. The base register 264 contains an isolated base value 265. The length register 266 contains a length value 267. The isolated mask, base, and length values 263, 265, and 267 form the isolated setting 268 and are used to define the isolated memory area. The isolated memory area may be defined by using any combination of the mask, base, and length values 263, 265, and 267. For example, the base value 265 corresponds to the starting address of the isolated memory area, while the sum of the base value 265 and the length value 267 corresponds to the ending address of the isolated memory area.

The access checking circuit 270 checks the access transaction using at least one of the configuration parameters (e.g., the execution mode word 253, the isolated setting 268) and the access information 226. The access checking circuit 270 generates the processor isolated access signal 272, the access grant signal 274, and the processor snoop access signal 276 using at least one of the isolated area parameters in the configuration storage 250 and the access information 226 in a transaction generated by the processor 110 and an FSB physical address 228. The FSB physical address 228 is typically provided by another processor and is snooped on the FSB. The processor isolated access signal 272 is asserted when the processor 110 is configured in the isolated execution mode. The access grant signal 274 is used to indicate if an isolated access has been granted. The processor snoop access signal 276 is used to determine if an isolated access results in a hit or a miss.

Figure 3A:
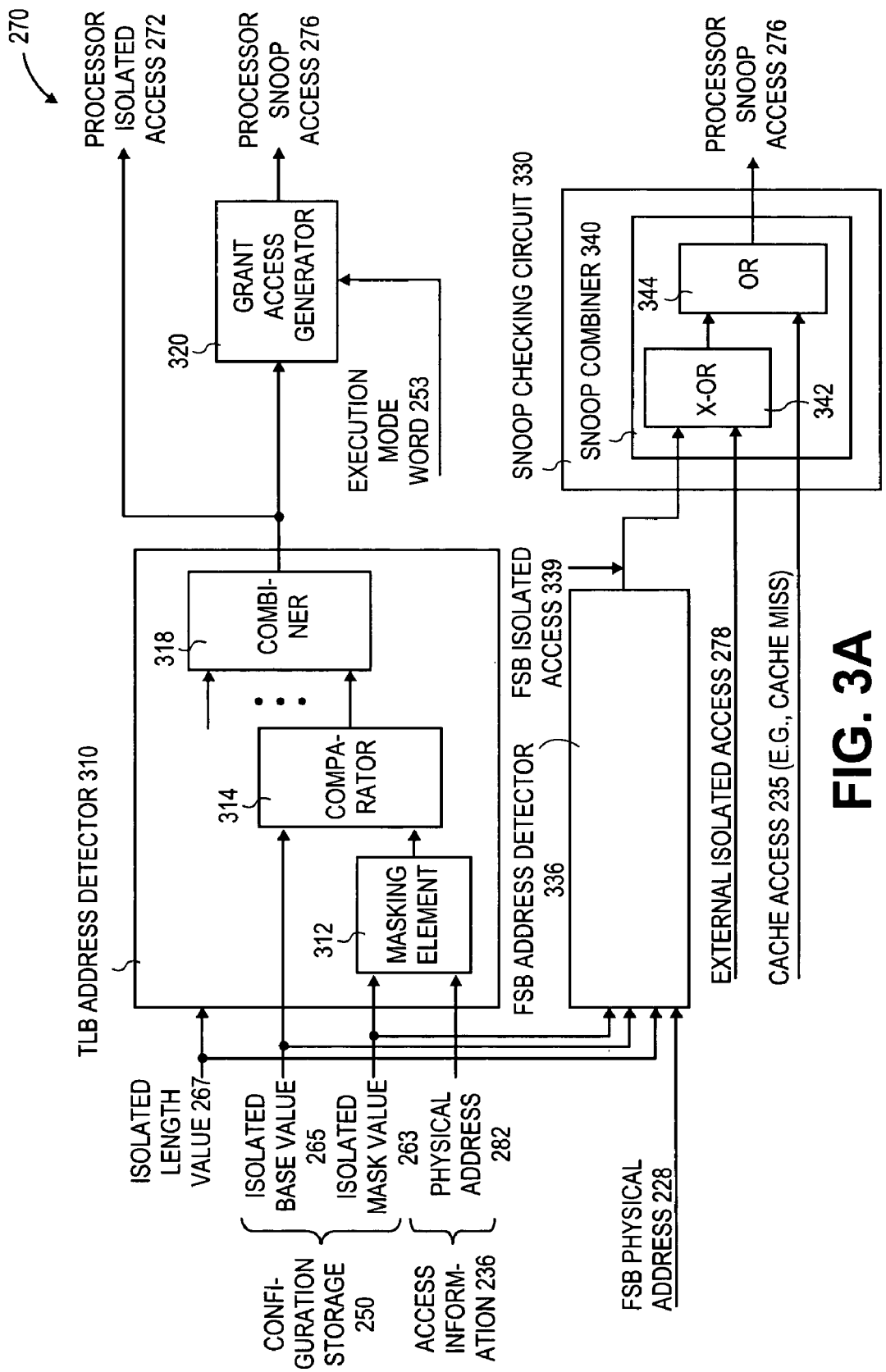
FIG. 3A is a diagram illustrating the access checking circuit to manage snoop accesses according to one embodiment of the invention.

FIG. 3A is a diagram illustrating the access checking circuit 270 to manage snoop accesses according to one embodiment of the invention. The access checking circuit 270 includes a TLB address detector 310 and an FSB address detector 336, an access grant generator 320, and a snoop checking circuit 330.

The TLB address detector 310 receives the isolated setting 268 (e.g., the isolated mask value 263, the isolated base value 265) from the configuration storage 250 in FIG. 2B. The TLB address detector 310 detects if the physical address 282 is within the isolated memory area defined by the isolated setting 260. The TLB address detector 310 includes a masking element 312, a comparator 314, and a combiner 318. The masking element 312 masks the physical address 282 with the isolated mask value 263. In one embodiment, the masking element 312 performs a logical AND operation. The comparator 314 compares the result of the masking operation done by the masking element 312 and the isolated base value 265, and generates a comparison result. The combiner 318 combines the comparison result with other conditions to generate the processor isolated access signal 272. The processor isolated access signal 272 is asserted when the physical address 282 is within the isolated memory area as defined by the isolated mask and base values 263 and 265, respectively, and when other conditions are satisfied.

The FSB address detector 336 essentially performs similar tasks as the TLB address detector 310. It also has a masking element, a comparator, and a combiner. The address detector 336 receives the isolated setting 268 to detect if the FSB physical address 228 is within the isolated memory area defined by the isolated setting 260. The address detector 336 generates an FSB isolated access signal 339. In addition, the TLB and FSB address detectors 310 and 336 may include other circuits to check the limit or size of the isolated memory area using the isolated length value 267.

The access grant generator 320 combines the processor isolated access signal 272 and the execution mode word 253 to generate an access grant signal 274. The access grant signal 274 is asserted when both the isolated access signal 272 and the execution mode word 253 are asserted to indicate that an isolated access is valid or allowed as configured. In one embodiment, the access grant generator 320 performs a logical AND operation. If an access to the isolated memory area is attempted and the access grant signal 274 is de-asserted, an failure or fault condition is generated.

The snoop checking circuit 330 generates the processor snoop access signal 276. The snoop checking circuit 330 includes a snoop combiner 340 to combine the cache access signal 235, the FSB isolated access signal 339, and an external isolated access signal 278 from another processor. The combined cache access signal 235, the FSB isolated access signal 339 and the external isolated access signal 278 correspond to the processor snoop access signal 276. In one embodiment, the snoop combiner 340 includes an exclusive-OR (X-OR) element 342 and an OR element 344. The X-OR element 342 performs an exclusive-OR operation on the isolated access signal 272 and the external isolated access 278. The OR element 344 performs an OR operation on the result of the X-OR element 342 and the cache access signal 235.

The snoop combiner 340 ensures proper functionality in a multiprocessor system when not all the processors have been initialized for isolated memory area accesses. For example, the configuration storage, including the isolated setting, may not yet be initialized. The X-OR element 342 ensures that a snoop hit can only occur from a processor that has been allowed for isolated access. If one processor is not yet participating in the isolated memory area accesses, it will not be able to snoop a line out of another processor that is participating in the isolated memory area accesses. Similarly, a processor that has been enabled for isolated accesses will not inadvertently snoop a line out of another processor that has not yet been enabled.

The processor snoop access signal 276 is asserted indicating there is an access miss when the cache access signal 235 is asserted indicating there is a cache miss, or when the FSB isolated access signal 339 and the external isolated access signal 278 do not match.

Figure 3B:
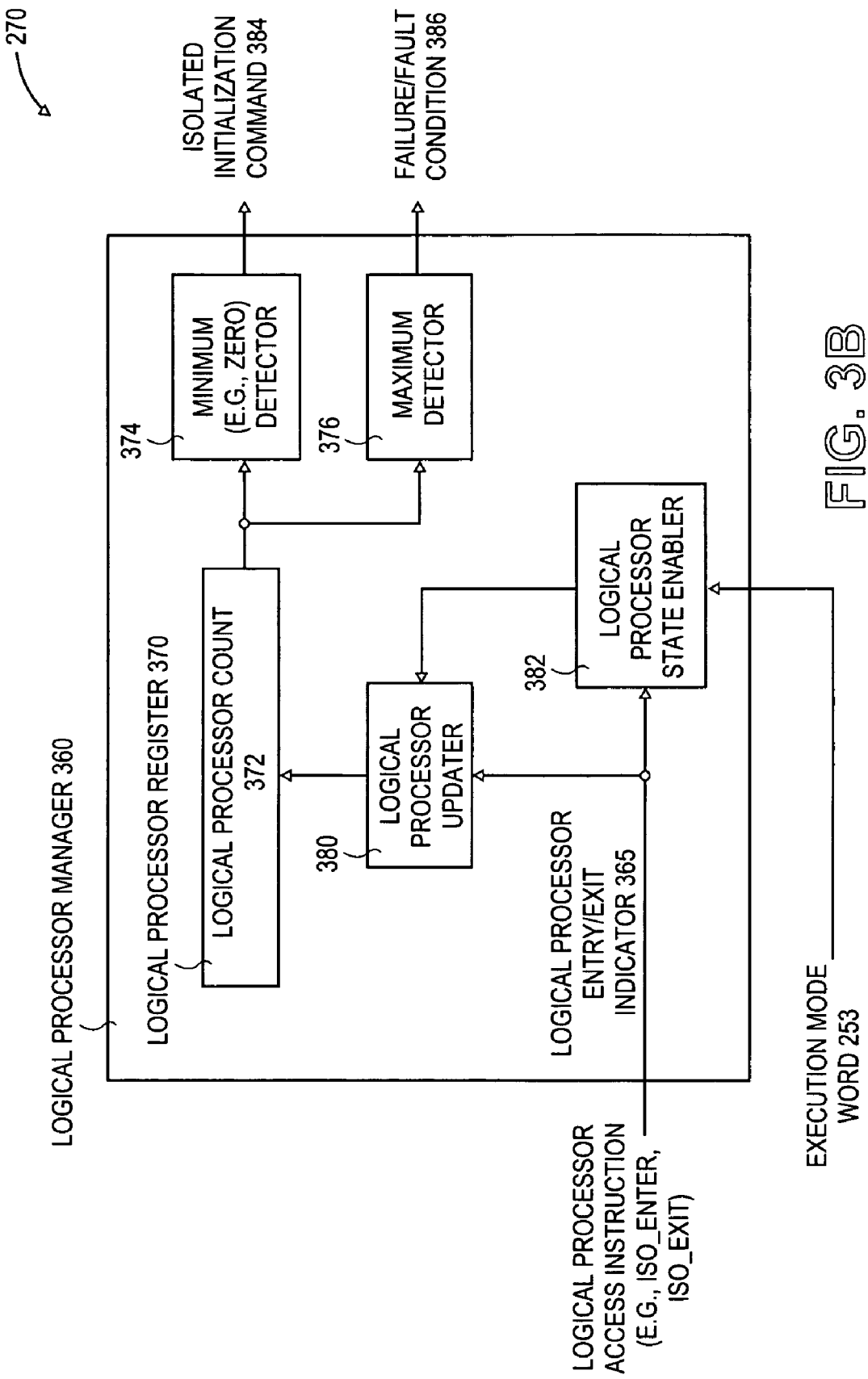
FIG. 3B is a diagram illustrating the access checking circuit to manage process logical processor operations according to another embodiment of the invention.

FIG. 3B is a diagram illustrating the access checking circuit 270 to manage process logical processor operations according to another embodiment of the invention. The access checking circuit 270 includes a logical processor manager 360.

A physical processor may have a number of logical processors, each has its own logical processor. Each logical processor may enter or exit a logical processor state, referred to as a logical processor access. A logical processor access is typically generated when the corresponding logical processor executes an isolated instruction, such as isolated enter (iso_enter) and isolated_exit (iso_exit). The logical processor manager 360 manages a logical processor operation caused by the logical processor access. Essentially, the logical processor manager 360 keeps track of the number of enabled logical processors in the processor. The logical processor manager 360 includes a logical processor register 370, a logical processor state enabler 382, a logical processor updater 380, a minimum detector 374, and a maximum detector 376. The logical processor register 370 store a logical processor count 372 to indicate a number of logical processors currently enabled. The logical processor state enabler 382 enables a logical processor state when the logical processor access is valid. The logical processor updater 380 updates the logical processor count 372 according to the logical processor access. The logical processor updater 380 is enabled by the enabled logical processor state. In one embodiment, the logical processor register 370 and the logical processor updater 380 are implemented as an up/down counter with enable. The minimum detector 374 determines if the logical processor count 372 is equal to a minimum logical processor value (e.g., zero). The maximum detector 376 determines if the logical processor count 372 exceeds a maximum logical processor value. The maximum logical processor value is a number indicating the maximum number of logical processors that can be supported by the isolated execution mode in the processor 110.

The logical processor updater 380 initializes the logical processor register 370 when there is no enabled logical processor. The logical processor updater 380 updates the logical processor count 372 in a first direction (e.g., incrementing) when the access transaction corresponds to the logical processor entry. The logical processor updater 380 updates the logical processor count 372 in a second direction opposite to the first direction (e.g., decrementing) when the access transaction corresponds to the logical processor exit or a logical processor withdrawal. When the logical processor count 372 is equal to the minimum logical processor value, the logical processor manager 360 causes the processor 110 to initialize the cache memory 232 (FIG. 2A) and the isolated setting register (FIG. 2A) from all isolated information to restore the initial conditions in these storage elements. When the logical processor count 372 exceeds the maximum logical processor value, the logical processor manager 360 causes the processor 110 to generate a failure or fault condition because the total number of logical processors exceed the maximum number of logical processors that can be supported in the processor.

Figure 4:
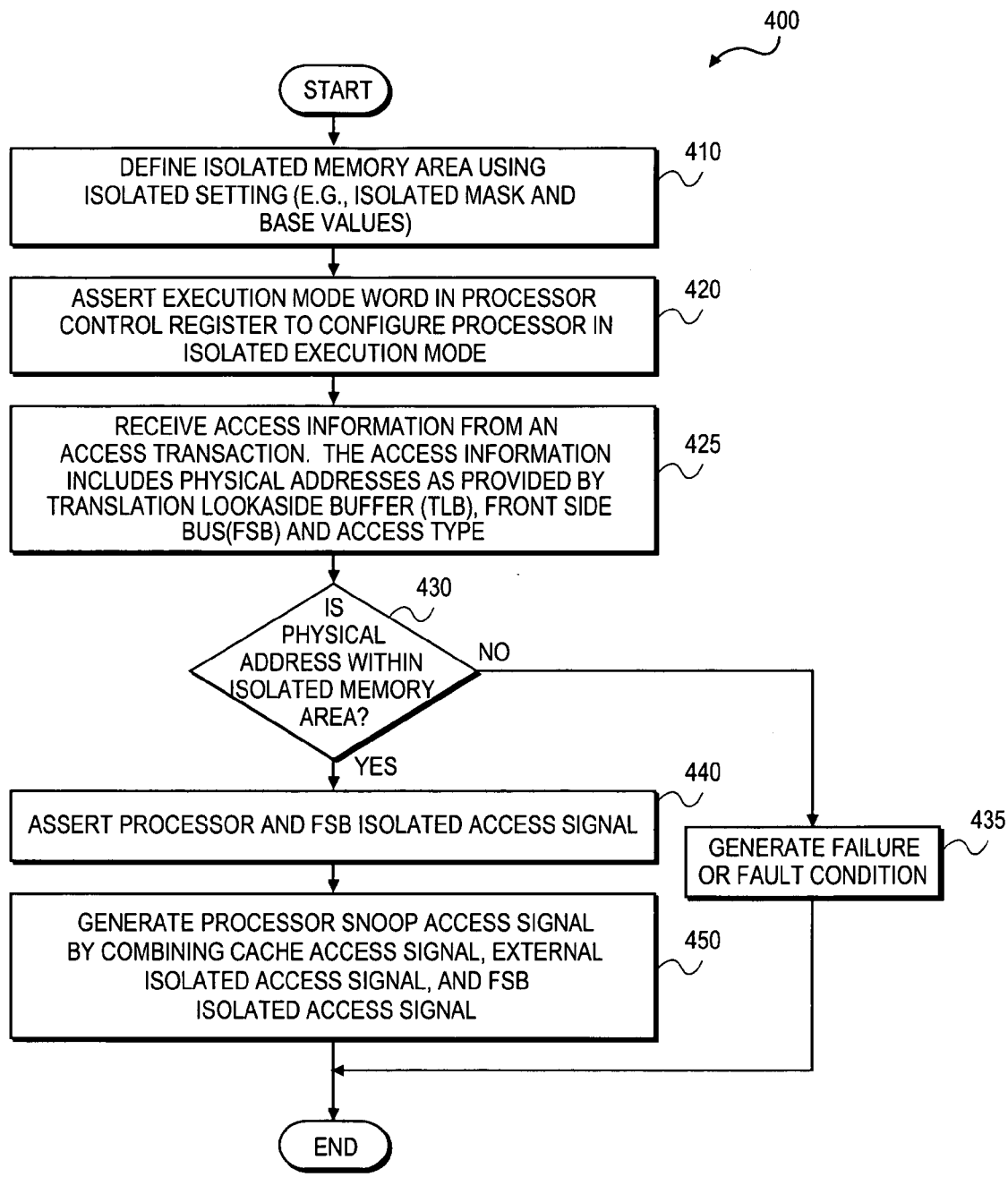
FIG. 4 is a flowchart illustrating a process to manage snoop accesses for isolated execution according to one embodiment of the invention.

FIG. 4 is a flowchart illustrating a process 400 to manage snoop accesses for isolated execution according to one embodiment of the invention.

Upon START, the process 400 defines an isolated memory area using the isolated setting (e.g., isolated mask and base values) (Block 410). Then, the process 400 asserts the execution mode word in the processor control register to configure the processor in the isolated execution mode (Block 420). Then, the process 400 receives the access information from an access transaction by the processor (Block 425). The access information includes a physical address (as provided by the TLB) and an access type. Next, the process 400 determines if the physical address as generated in a transaction is within the isolated memory area as defined by the isolated setting (Block 430). If not, the process 400 generates a failure or fault condition (Block 435) and is then terminated. Otherwise, the process 400 asserts the isolated access signal (Block 440).

Next, the process 400 generates a processor snoop access signal by combining the cache access signal, the external isolated access signal, and the processor isolated access signal. Then the process 400 is terminated.

Figure 5:
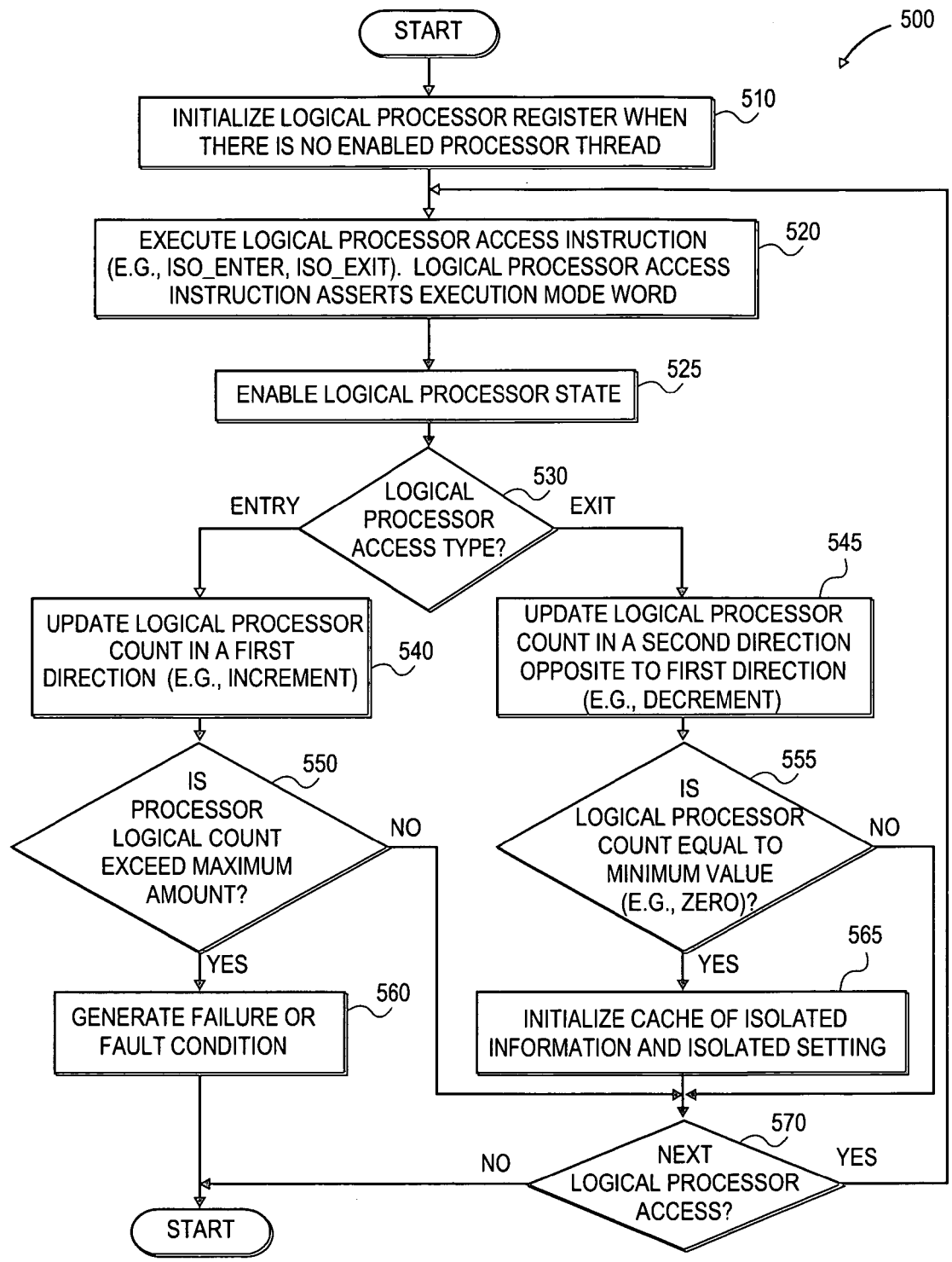
FIG. 5 is a flowchart illustrating a process to manage process logical processor operations for isolated execution according to one embodiment of the invention.

FIG. 5 is a flowchart illustrating a process 500 to manage process logical processor operations for isolated execution according to one embodiment of the invention.

Upon START, the process 500 initializes the logical processor register when there is no enabled logical processor (Block 510). Then the process 500 executes a logical processor access instruction (e.g., iso_enter, iso_exit). The logical processor access instruction asserts the execution mode word. Next, the process 500 enables the logical processor state (Block 525). Then, the process 500 determines the logical processor access type (Block 530).

If the logical processor access type is a logical processor entry, the process 500 updates the logical processor count in a first direction (e.g., incrementing) (Block 540). Then, the process 500 determines if the logical processor count exceeds the maximum logical processor value (Block 550). If not, the process 500 goes to block 570. Otherwise, the process 500 generates a failure or fault condition (Block 560) and is then terminated.

If the logical processor access type is a logical processor exit or logical processor withdrawal, the process 500 updates the logical processor count in a second direction opposite to the first direction (e.g., decrementing) (Block 545). Then, the process 500 determines if the logical processor count is equal to the minimum value (e.g., zero) (Block 555). If not, the process 500 goes to block 570. Otherwise, the process 500 initializes the cache memory and the isolated setting register from all the isolated information (Block 565).

Next, the process 500 determines if there is a next logical processor access (Block 570). If there is a next logical processor access, the process 500 returns to block 520 to execute a logical processor access instruction. If there is no more logical processor access, the process 500 is terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
setting a first processor in a processing system to operate in an isolated execution mode, wherein the first processor supports (a) the isolated execution mode in a ring 0 operating mode, (b) a normal execution mode in the ring 0 operating mode, and (c) one or more higher ring operating modes;
configuring the processing system to establish an isolated memory area in a memory of the processing system;
detecting, at the first processor, a snoop transaction from a second processor; and
disallowing the snoop transaction if (a) the snoop transaction requests access to an address that is cached by the first processor, (b) said address resides in the isolated memory area, and (c) the second processor is not set to operate in the isolated execution mode.

2. A method according to claim 1, further comprising:
detecting, at the first processor, a transaction that requests access to the memory of the processing system; and
disallowing the transaction if (a) the transaction involves the isolated memory area and (b) the first processor is not set to operate in the isolated execution mode.

3. A method according to claim 2 further comprising:
in response to detecting the transaction that requests access to the memory, determining, based at least in part on a physical address from a translation lookaside buffer (TLB) of the processor, whether the transaction involves the isolated memory area.

4. A method according to claim 1, wherein the operation of detecting a snoop transaction from a second processor comprises:
receiving the snoop transaction from a front side bus (FSB) responsive to the first processor.

5. A method according to claim 1, wherein the operation of detecting a snoop transaction from a second processor comprises:
receiving the snoop transaction from a front side bus (FSB), wherein the snoop transaction specifies a physical address to be accessed.

6. A method according to claim 1, further comprising:
disallowing snoop transactions involving addresses that reside in the isolated memory area if the first and second processors are not both set to operate in the isolated execution mode.

7. A method according to claim 1, wherein the operation of disallowing the snoop transaction is performed by an access checking circuit of the first processor.

8. A method according to claim 1, further comprising:
determining, based at least in part on an isolated execution mode setting in a processor control register of the first processor, whether the first processor is set to operate in the isolated execution mode.

9. An apparatus for use in a processing system having memory, the apparatus comprising:
a first processor for a processing system, wherein the first processor supports (a) an isolated execution mode in a ring 0 operating mode, (b) a normal execution mode in the ring 0 operating mode, and (c) one or more higher ring operating modes, the processor operable to detect a snoop transaction from a second processor; and
an access checking circuit in the first processor, the access checking circuit operable to disallow the snoop transaction if (a) the snoop transaction requests access to an address that is cached by the first processor, (b) said address resides in an isolated memory area in a memory of the processing system, and (c) the second processor is not set to operate in the isolated execution mode.

10. An apparatus according to claim 9, further comprising:
the first processor operable to detect a memory transaction that requests access to the memory of the processing system; and
the access checking circuit operable to disallow the memory transaction if (a) the memory transaction involves the isolated memory area and (b) the first processor is not set to operate in the isolated execution mode.

11. An apparatus according to claim 10, wherein the memory transaction comprises a transaction generated during execution of an instruction in the first processor.

12. An apparatus according to claim 11, further comprising:
a translation lookaside buffer (TLB) in the first processor; and
the access checking circuit operable to determine, based at least in part on a physical address from the TLB, whether the memory transaction involves the isolated memory area.

13. An apparatus according to claim 10, further comprising:
the first processor operable to assert a signal to grant access for the memory transaction if the first processor is set to operate in the isolated execution mode.

14. An apparatus according to claim 9, further comprising:
the access checking circuit operable to determine whether to allow the snoop transaction based at least in part on a cache access signal from the first processor and an isolated access signal from the second processor.

15. An apparatus according to claim 9, further comprising:
the access checking circuit operable to disallow snoop transactions from the second processor involving the isolated memory area if the first and second processors are not both set to operate in the isolated execution mode.

16. A processing system comprising:
first and second processors that can each be set to operate in a normal execution mode in a ring 0 operating mode and, alternatively, to operate in an isolated execution mode in the ring 0 operating mode, wherein the first processor also supports one or more higher ring operating modes, the first processor operable to detect a snoop transaction from the second processor;
memory to include an isolated memory area, the memory responsive to the first processor; and
an access checking circuit in the first processor, the access checking circuit operable to disallow the snoop transaction if (a) the snoop transaction requests access to an address that is cached by the first processor, (b) said address resides in the isolated memory area, and (c) the second processor is not set to operate in the isolated execution mode.

17. A processing system according to claim 16, further comprising:
the first processor operable to detect a memory transaction that requests access to the memory of the processing system; and
the access checking circuit operable to disallow the memory transaction if (a) the memory transaction involves the isolated memory area and (b) the first processor is not set to operate in the isolated execution mode.

18. A processing system according to claim 17, wherein:
the memory transaction comprises a transaction generated during execution of an instruction in the first processor.

19. A processing system according to claim 17, further comprising:
a translation lookaside buffer (TLB) in the first processor; and
the access checking circuit operable to determine, based at least in part on a physical address from the TLB, whether the memory transaction involves the isolated memory area.

20. A processing system according to claim 17, further comprising:
the first processor operable to assert a signal to grant access for the memory transaction if the first processor is set to operate in the isolated execution mode.

21. A processing system according to claim 16, further comprising:
the access checking circuit operable to determine whether to allow the snoop transaction based at least in part on a cache access signal from the first processor and an isolated access signal from the second processor.

22. A processing system according to claim 16, further comprising:
the access checking circuit operable to disallow snoop transactions from the second processor involving the isolated memory area if the first and second processors are not both set to operate in the isolated execution mode.

* * * * *

UNITED STATES PATENT AND TRADEMARK OFFICE
CERTIFICATE OF CORRECTION

| | | |
|---|---|---|
| PATENT NO. | : 7,089,418 B1 | Page 1 of 1 |
| APPLICATION NO. | : 09/540611 | |
| DATED | : August 8, 2006 | |
| INVENTOR(S) | : Ellison et al. | |

It is certified that error appears in the above-identified patent and that said Letters Patent is hereby corrected as shown below:

Column 1, at line 16, delete "modem" and insert --modern--.

Column 4, at line 40, delete "ring-00S" and insert --ring-0 OS--.

Column 6, at line 5, delete "1 10a," and insert --110a,--.

Column 6, at line 5, delete "10b," and insert --110b,--.

Column 9, at line 8, delete "1115" and insert --115--.

Column 9, at line 28, delete "2 1 0" and insert --210--.

Signed and Sealed this

Thirteenth Day of November, 2007

JON W. DUDAS
*Director of the United States Patent and Trademark Office*